(12) United States Patent
Ogawa et al.

(10) Patent No.: US 9,586,847 B2
(45) Date of Patent: Mar. 7, 2017

(54) TIN OXIDE REFRACTORY AND METHOD FOR ITS PRODUCTION

(71) Applicant: ASAHI GLASS COMPANY, LIMITED, Chiyoda-ku (JP)

(72) Inventors: Shuhei Ogawa, Tokyo (JP); Yasuo Shinozaki, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 70 days.

(21) Appl. No.: 14/319,313

(22) Filed: Jun. 30, 2014

(65) Prior Publication Data

US 2014/0311186 A1   Oct. 23, 2014

Related U.S. Application Data

(63) Continuation of application No. PCT/JP2012/083928, filed on Dec. 27, 2012.

(30) Foreign Application Priority Data

Dec. 28, 2011   (JP) ................................. 2011-289690

(51) Int. Cl.
C04B 35/457 (2006.01)
C03B 5/43 (2006.01)
F27D 1/00 (2006.01)
C04B 35/111 (2006.01)
C04B 35/48 (2006.01)

(52) U.S. Cl.
CPC ............. C03B 5/43 (2013.01); C04B 35/111 (2013.01); C04B 35/457 (2013.01); C04B 35/481 (2013.01); F27D 1/0006 (2013.01); C04B 2235/3201 (2013.01); C04B 2235/3203 (2013.01); C04B 2235/3208 (2013.01); C04B 2235/3217 (2013.01); C04B 2235/3244 (2013.01); C04B 2235/3248 (2013.01); C04B 2235/3265 (2013.01); C04B 2235/3272 (2013.01); C04B 2235/3281 (2013.01); C04B 2235/3284 (2013.01); C04B 2235/3294 (2013.01); C04B 2235/3418 (2013.01); C04B 2235/5436 (2013.01); C04B 2235/5445 (2013.01); C04B 2235/6565 (2013.01); C04B 2235/85 (2013.01); C04B 2235/9669 (2013.01)

(58) Field of Classification Search
CPC .... C04B 35/482; C04B 35/111; C04B 35/457
See application file for complete search history.

(56) References Cited

U.S. PATENT DOCUMENTS

| 4,053,321 A | 10/1977 | Okumiya et al. |
| 2012/0279856 A1* | 11/2012 | Medvedovski ....... C04B 35/457 204/298.13 |

FOREIGN PATENT DOCUMENTS

| DE | 205 888 A1 | 1/1984 |
| JP | 42-25290 | 12/1967 |
| JP | 44-13027 | 6/1969 |
| JP | 50-18505 | 2/1975 |
| JP | 54-132611 | 10/1979 |
| JP | 54-132611 A | 10/1979 |
| JP | 55-121208 A | 9/1980 |
| JP | 60-42182 B2 | 9/1985 |
| JP | 61-9268 B2 | 3/1986 |
| JP | 2003-512288 | 4/2003 |
| WO | WO 01/30710 A1 | 5/2001 |
| WO | WO 2006/124742 A2 | 11/2006 |
| WO | WO 2006/124742 A3 | 11/2006 |

OTHER PUBLICATIONS

Extended European Search Report issued Dec. 22, 2015 in Patent Application No. 12862428.5.
A. Maitre, et al., "Effect of ZrO2 additions on sintering of SnO2-based Ceramics", Journal of the European Ceramic Society, vol. 24, 2004, pp. 3111-3118.
International Search Report issued Apr. 16, 2013 in PCT/JP2012/083928 filed Dec. 27, 2012.
Gaillard-Allemand, B. et al., Experimental study of the SnO2-ZrO2 phase diagram, Journal of the European Ceramic Society, 2002, vol. 22, pp. 2297-2303.

* cited by examiner

Primary Examiner — Queenie Dehghan
(74) Attorney, Agent, or Firm — Oblon, McClelland, Maier & Neustadt, L.L.P.

(57) ABSTRACT

To provide a tin oxide refractory which prevents volatilization of $SnO_2$ in a high temperature zone from an early stage and which also has high erosion resistance to glass.

A tin oxide refractory comprising $SnO_2$, $SiO_2$ and $ZrO_2$ as essential components, wherein the total content of $SnO_2$, $SiO_2$ and $ZrO_2$ in the tin oxide refractory is at least 70 mass %, and, based on the total content of $SnO_2$, $SiO_2$ and $ZrO_2$, the content of $SnO_2$ is from 32 to 98 mol %, the content of $SiO_2$ is from 1 to 35 mol % and the content of $ZrO_2$ is from 1 to 35 mol %.

5 Claims, No Drawings

US 9,586,847 B2

TIN OXIDE REFRACTORY AND METHOD FOR ITS PRODUCTION

TECHNICAL FIELD

The present invention relates to a tin oxide refractory, particularly to a tin oxide refractory which contains $SiO_2$ and $ZrO_2$ as essential components and which, by containing them in prescribed amounts not to substantially reduce the erosion resistance to glass, effectively prevents volatilization of $SnO_2$, and a method for its production.

BACKGROUND ART

A tin oxide refractory prepared by sintering a refractory composition containing tin oxide ($SnO_2$) as the main component, has very high erosion resistance to glass, as compared with a refractory which is commonly used, and its use as a refractory for a glass melting furnace is being studied.

For example, Patent Document 1 has proposed a tin oxide refractory for a glass melting furnace containing from 85 to 99 wt % of $SnO_2$. However, no case has been known in which such a refractory is practically used as a refractory for a portion in contact with glass in a glass production apparatus.

The reason is that as a basic characteristic, $SnO_2$ has such a nature that it volatilizes as $SnO$ in a high temperature zone, particularly in a high temperature zone of at least 1,200° C. Such volatilization is considered to bring about such a problem that the surface structure of the refractory tends to be porous and brittle, and $SnO_2$ itself tends to peel off, or a volatilized $SnO$ component tends to be concentrated and coagulated in a low temperature zone in the glass melting apparatus, so that a $SnO_2$ component will fall and be included as a foreign matter in glass, thus leading to deterioration of the yield in the production of a molded product of glass.

On the other hand, a $SnO_2$ sintered body is used as an electrode material for glass melting in a high temperature zone. Usually, such a $SnO_2$ electrode material is made of from 90 to 98 mass % of $SnO_2$ and from about 0.1 to 2.0 mass % of a sintering assistant and an agent to reduce electrical resistance and is utilized as a material having both properties of high erosion resistance to molten glass and low electrical resistance sufficient for power distribution. However, such a common $SnO_2$ electrode material tended to gradually volatilize as $SnO$ in a high temperature zone, particularly in a high temperature zone of at least 1,200° C., whereby deterioration was unavoidable.

As a conventional technique to solve the problem of volatilization of $SnO_2$ in a high temperature zone, Non-patent Document 1 has reported on a $SnO_2$ sintered body wherein 0.5 mol % of $CoO$ as a sintering assistant is incorporated to a $SnO_2$ powder and from 0 to 10 mol % of $ZrO_2$ as a volatilization-preventing component is incorporated based on the total content of $ZrO_2$ and $SnO_2$, to prevent volatilization of $SnO_2$.

Further, Patent Document 2 has proposed an electrode material for a glass melting furnace, wherein together with a sintering assistant and an agent to reduce electrical resistance, as a volatilization-preventing agent, a Y component being an oxide such as $ZrO_2$, $HfO_2$, $TiO_2$, $Ta_2O_5$ or $CeO_2$ is incorporated in an amount of from 0 to 8 mass % based on the total content of Y and $SnO_2$, to prevent volatilization of $SnO_2$.

These $SnO_2$ sintered bodies containing a volatilization-preventing component have a structure having the volatilization-preventing agent solid-solubilized inside of $SnO_2$ particles, and when $SnO_2$ volatilizes in a high temperature zone, the volatilization-preventing agent solid-solubilized inside of $SnO_2$ particles will be concentrated and will precipitate on the $SnO_2$ particle surface to cover the $SnO_2$ particle surface, whereby it is possible to prevent volatilization of $SnO_2$.

PRIOR ART DOCUMENTS

Patent Documents

Patent Document 1: JP-A-54-132611
Patent Document 2: WO2006/124742

Non-Patent Document

Non-patent Document 1: Maitre, D. Beyssen, R. Podor, "Effect of $ZrO_2$ additions on sintering of $SnO_2$-based ceramics", Journal of the European Ceramic Society, 2004, Vol. 24, p. 3111-3118

DISCLOSURE OF INVENTION

Technical Problem

However, the above $SnO_2$ volatilization-preventing component starts to precipitate on the $SnO_2$ particle surface for the first time when it has been concentrated in the $SnO_2$ particles to exceed its solid solubility limit concentration by volatilization of $SnO_2$, and therefore, at the initial stage after beginning of volatilization of $SnO_2$, the volatilization-preventing component is not sufficiently precipitated on the $SnO_2$ particle surface, and an excellent volatilization-preventing effect is not provided from the initial stage after beginning of the volatilization. Therefore, if such a $SnO_2$ sintered body is used as a component for a long period of time, the deterioration of the component due to volatilization of $SnO_2$ is unavoidable.

Accordingly, in a case where such a $SnO_2$ sintered body is used for a glass production apparatus, a problem is considered to be likely to occur such that due to brittleness of the sintered body surface, $SnO_2$ itself tends to peel off, or a volatilized $SnO$ component tends to be concentrated and coagulated in a low temperature zone in the glass melting apparatus, so that the $SnO_2$ component will fall and be included as a foreign matter in glass, thus leading to deterioration of the yield in the production of a molded product of glass.

Therefore, it is an object of the present invention to solve the above problem of the prior art and to provide a tin oxide refractory which prevents volatilization of $SnO_2$ in a high temperature zone from an early stage and also has a high erosion resistance to glass, and which is suitable as a refractory for a glass production apparatus, and a process for its production.

Solution to Problem

[1] A tin oxide refractory comprising $SnO_2$, $SiO_2$ and $ZrO_2$ as essential components, wherein the total content of $SnO_2$, $SiO_2$ and $ZrO_2$ in the tin oxide refractory is at least 70 mass %, and, based on the total content of $SnO_2$, $SiO_2$ and $ZrO_2$, the content of $SnO_2$ is from 32 to 98 mol %, the content of $SiO_2$ is from 1 to 35 mol % and the content of $ZrO_2$ is from 1 to 35 mol %.

[2] The tin oxide refractory according to above [1], wherein after heat treatment at 1,300° C. for 350 hours, a $ZrSiO_4$ phase and a $ZrO_2$ phase are formed on the sintered body surface of the tin oxide refractory.

[3] The tin oxide refractory according to above [1] or [2], wherein the total content of $SnO_2$, $SiO_2$ and $ZrO_2$ is at least 95 mass %.

[4] The tin oxide refractory according to any one of above [1] to [3], wherein, based on the total content of $SnO_2$, $SiO_2$ and $ZrO_2$, the content of $SnO_2$ is from 76 to 98 mol %, the content of $SiO_2$ is from 1 to 12 mol % and the content of $ZrO_2$ is from 1 to 12 mol %.

[5] The tin oxide refractory according to any one of above [1] to [4], which further contains at least one component selected from the group consisting of oxides of CuO, $Cu_2O$, ZnO, $Mn_2O_3$, CoO, $Al_2O_3$, $Sb_2O_3$ and $Li_2O$.

[6] The tin oxide refractory according to any one of above [1] to [5], wherein after heat treatment at 1,300° C. under −700 mmHg for 350 hours, the volatilization rate of $SnO_2$ is at most 1/5 as compared with a $SnO_2$ sintered body having a $SnO_2$ content of at least 99 mol %.

[7] A glass melting furnace provided with the tin oxide refractory as defined in any one of above [1] to [6].

[8] A method for producing a tin oxide refractory, which comprises uniformly mixing powder raw materials, forming the mixture into a desired shape and subjecting the formed mixture to sintering treatment, wherein the tin oxide refractory comprises $SnO_2$, $SiO_2$ and $ZrO_2$ as essential components, and as a powder raw material for the $SiO_2$ and $ZrO_2$ components, a $ZrSiO_4$ powder is used.

Advantageous Effects of Invention

The tin oxide refractory of the present invention contains $SnO_2$ having a high erosion resistance to glass and $ZrO_2$ and $SiO_2$ having a high effect to prevent volatilization of $SnO_2$ in a high temperature zone in good balance, whereby it is possible to provide a highly erosion resistant refractory which is capable of exhibiting an excellent volatilization-preventing effect from the initial stage after beginning of volatilization of $SnO_2$.

Further, according to the method for producing a tin oxide refractory of the present invention, it is possible to obtain the above tin oxide refractory having excellent characteristics efficiently by a simple operation and with a constant product quality.

DESCRIPTION OF EMBODIMENTS

The present invention is characterized in that $SnO_2$, $SiO_2$ and $ZrO_2$ are incorporated so that their contents in the tin oxide refractory would be in the prescribed amounts. Now, the present invention will be described in detail.

$SnO_2$ to be used in the present invention has high resistance to erosion by molten glass and high heat resistance, and thus is incorporated as the main component of the refractory.

$SiO_2$ to be used in the present invention is a component to form matrix glass and to provide a stress relaxation function. Further, it is a component having a function to prevent volatilization of $SnO_2$ being the main component in the refractory.

$ZrO_2$ to be used in the present invention is a component having high resistance to erosion by molten glass and also having a function to prevent volatilization of $SnO_2$ being the main component in the refractory.

In the present invention, the total content of $SnO_2$, $SiO_2$ and $ZrO_2$ contained in the refractory is adjusted to be at least 70 mass %. The reason is such that if other components are contained in the refractory too much, the content of $SnO_2$, $SiO_2$ and $ZrO_2$ decreases, and particularly, the excellent erosion resistance of $SnO_2$ to glass tends to be impaired. In order to bring the erosion resistance to be good, the total content of $SnO_2$, $SiO_2$ and $ZrO_2$ is preferably at least 85 mass %, more preferably at least 95 mass %. Further, the total content of $SnO_2$, $SiO_2$ and $ZrO_2$ is preferably from 97 to 99.5 mass %.

Further, in the present invention, when the total content of $SnO_2$, $SiO_2$ and $ZrO_2$ being essential components is regarded to be 100 mol %, $SnO_2$ is contained in an amount of from 32 to 98 mol %, $SiO_2$ is contained in an amount of from 1 to 35 mol %, and $ZrO_2$ is contained in an amount of from 1 to 35 mol %.

In the present invention, by adjusting the content of $SnO_2$, $SiO_2$ and $ZrO_2$ in the refractory to be within the prescribed range as mentioned above, and further adjusting the relation of these components to have the prescribed relation, it is possible to obtain a tin oxide refractory which prevents volatilization of $SnO_2$ in a high temperature zone from an early stage and which also has high erosion resistance to glass.

As a result of a study on the contents of $SnO_2$, $SiO_2$ and $ZrO_2$, the present inventors have found that in a case where two components of $SnO_2$ and $ZrO_2$ are used as the main components without incorporating $SiO_2$, $ZrO_2$ to exhibit an effect to prevent volatilization of $SnO_2$ is present as solid-solubilized in $SnO_2$. And, the characteristics of the obtainable refractory are influenced by the firing temperature and the temperature lowering rate at the time of producing the refractory, but, for example, in a case where firing was carried out at 1,400° C. for 5 hours and the temperature lowering was carried out at a rate of 300° C./hr, the solid solubility limit concentration of $ZrO_2$ in $SnO_2$ was from about 20 to 25 mol %.

Whereas, when the composition is made to contain $SiO_2$ as in the present invention, the solid solubility limit concentration of $ZrO_2$ in $SnO_2$ decreases to a large extent to about 12 mol %, although the cause is not clearly understood. Therefore, in the composition range containing $SiO_2$, as compared with a case where only $ZrO_2$ is contained without containing $SiO_2$, at the time of volatilizing $SnO_2$ in a high temperature zone, $ZrO_2$ solid-solubilized in $SnO_2$ reaches the solid solubility limit in an early stage and will precipitate on the $SnO_2$ particle surface. Thus, it becomes possible to exhibit an excellent effect to prevent volatilization of $SnO_2$ from the initial stage after beginning of volatilization, as compared with a case where no $SiO_2$ is contained.

Further, the majority of $SiO_2$ present in a non-crystallized state at the grain boundary of $SnO_2$ having $ZrO_2$ solid-solubilized therein (hereinafter referred to also as $SnO_2$—$ZrO_2$ solid solution) will react with $ZrO_2$ precipitated as exceeded the solid solubility limit and will be present as $ZrSiO_4$ at the grain boundary of the $SnO_2$—$ZrO_2$ solid solution thereby to reduce the relative surface area of $SnO_2$. Thus, an excellent volatilization-preventing effect over a long period of time is obtainable also as compared with a case where $ZrO_2$ is contained without containing $SiO_2$.

Further, $ZrO_2$ not reactive with $SiO_2$ is also present, and such $ZrO_2$ exhibits a volatilization-preventing effect by itself. With respect to $ZrSiO_4$ and $ZrO_2$, their presence can be confirmed by means of an electron microscopic device such as SEM-EDX (Scanning Electron Microscope-Energy Dispersive X-ray Detector (manufactured by Hitachi High Technologies Corporation, trade name: S-3000H).

Here, the solid solubility limit concentration was determined as an approximate solid solubility limit concentration of $ZrO_2$ solid-solubilized in $SnO_2$ by analyzing a sintered body structure by means of SEM-EDX with respect to a sintered body obtained by changing the amount of $ZrSiO_4$ added.

Now, the reason for limiting the refractory in the present invention to the above composition will be explained as follows.

As mentioned above, when the total amount of $SnO_2$, $ZrO_2$ and $SiO_2$ is regarded as 100 mol %; if the contents of the respective components satisfy the relation of from 32 to 98 mol % of $SnO_2$, from 1 to 35 mol % of $ZrO_2$ and from 1 to 35 mol % of $SiO_2$, the solid solubility limit concentration of $ZrO_2$ decreases, and $ZrO_2$ starts to precipitate on the $SnO_2$ particle surface at an early stage after beginning of volatilization of $SnO_2$. Thus, an excellent effect to prevent volatilization of $SnO_2$ can be obtained from an earlier stage as compared with a case where no $SiO_2$ is contained. Further, the majority of $SiO_2$ will react with $ZrO_2$ precipitated as exceeded the solid solubility limit and will be present as $ZrSiO_4$ at the grain boundary of the $SnO_2$—$ZrO_2$ solid solution thereby to reduce the surface area of $SnO_2$ exposed to the exterior environment. Thus, an excellent effect to prevent volatilization of $SnO_2$ for a long period of time is obtainable as compared with a case where $ZrO_2$ is contained without containing $SiO_2$.

In this composition range, $ZrO_2$ is mainly in a state solid-solubilized in $SnO_2$, and a portion exceeding the solid solubility limit will precipitate at the grain boundary of $SnO_2$. The precipitated $ZrO_2$ will react with $SiO_2$ and will be present as $ZrSiO_4$ at the grain boundary of the $SnO_2$—$ZrO_2$ solid solution. However, depending upon the amount of $SiO_2$ present, unreacted one will be partially present as $ZrO_2$ at the grain boundary of the $SnO_2$—$ZrO_2$ solid solution.

$SiO_2$ reacts with $SnO_2$, $ZrO_2$ and other components and is present in a non-crystallized state at the grain boundary of a $SnO_2$—$ZrO_2$ solid solution, and when $ZrO_2$ precipitates at the grain boundary, it will react with $ZrO_2$ to form $ZrSiO_4$.

As described above, the tin oxide refractory of the present invention exhibits an excellent effect to prevent volatilization of $SnO_2$, because from an early stage in volatilization of $SnO_2$, the solid solubility amount of $ZrO_2$ in $SnO_2$ reaches the solid solubility limit concentration, and $ZrSiO_4$ and $ZrO_2$ are formed on the $SnO_2$ surface of the sintered body.

According to the tin oxide refractory of the present invention, for example, after heat treatment at 1,300° C. for 350° C., on the sintered body surface, a $ZrSiO_4$ phase and a $ZrO_2$ phase are formed. Further, in a case where the $SiO_2$ content is at least about 5 mol % based on the total amount of $SnO_2$, $ZrO_2$ and $SiO_2$, a $SiO_2$ phase also remains. Thus, if such high temperature treatment is done before use, it is possible to produce and use a refractory capable of exhibiting an excellent volatilization-preventing effect immediately after use.

At that time, if the content of $SiO_2$ is small at a level of less than 1 mol % based on the total content of $SnO_2$, $ZrO_2$ and $SiO_2$, a phenomenon of decrease in the solid solubility limit concentration of $ZrO_2$ in $SnO_2$ will not be observed, and development of the volatilization-preventing effect in the initial stage after beginning of volatilization of $SnO_2$ tends to be delayed to a certain extent, and since the $SiO_2$ content is small, even if $ZrO_2$ precipitates, formation of $ZrSiO_4$ will be less, whereby improvement in the volatilization-preventing effect will be small.

If the content of $ZrO_2$ is small at a level of less than 1 mol % based on the total content of $SnO_2$, $ZrO_2$ and $SiO_2$, the volatilization-preventing effect by $ZrO_2$ and $ZrSiO_4$ will be very small.

If the content of $SiO_2$ is large at a level of exceeding 35 mol % based on the total content of $SnO_2$, $ZrO_2$ and $SiO_2$, the content of $SiO_2$ is too much, whereby the content of $SnO_2$ tends to be small, and the erosion resistance to glass tends to decrease.

If the content of $ZrO_2$ is large at a level of exceeding 35 mol % based on the total content of $SnO_2$, $ZrO_2$ and $SiO_2$, the content of $ZrO_2$ is too much, whereby the content of $SnO_2$ tends to be small, and the erosion resistance to glass tends to decrease.

Here, in the tin oxide refractory of the present invention, the content of $ZrO_2$ is preferably within a range of from 1 to 12 mol % based on the total content of $SnO_2$, $ZrO_2$ and $SiO_2$. Further, the content of $SiO_2$ is also preferably within a range of from 1 to 12 mol % based on the total content of $SnO_2$, $ZrO_2$ and $SiO_2$. Accordingly, the content of $SnO_2$ is preferably within a range of from 76 to 98 mol % based on the total content of $SnO_2$, $ZrO_2$ and $SiO_2$.

Further, irrespective of the above conditions, sintering treatment is carried out usually by heat treatment at from 1,200 to 1,600° C. for from 3 to 5 hours. Therefore, depending upon the sintering conditions in actual treatment, the blend amounts of $SnO_2$, $ZrO_2$ and $SiO_2$ in the refractory composition may be adjusted.

Further, the above-mentioned other components are not particularly limited so long as they are ones not to impair the characteristics as the refractory of the present invention, and they may be known components which are used in tin oxide refractories.

Such other components may, for example, be oxides such as $CuO$, $Cu_2O$, $ZnO$, $Mn_2O_3$, $CoO$, $Li_2O$, $Al_2O_3$, $TiO_2$, $Ta_2O_5$, $CeO_2$, $CaO$, $Sb_2O_3$, $Nb_2O_5$, $Bi_2O_3$, $UO_2$, $HfO_2$, etc.

It is preferred to contain, among these oxides, at least one oxide selected from the group consisting of $CuO$, $ZnO$, $Mn_2O_3$, $CoO$, $Al_2O_3$, $Sb_2O_3$ and $Li_2O$. Further, $CuO$, $ZnO$, $Mn_2O_3$, $CoO$, $Li_2O$ or the like effectively serves as a sintering assistant. If such a sintering assistant is incorporated, the strength of the refractory may be more improved, for example, as densified by firing at 1,400° C. for 5 hours. Accordingly, it is more preferred to contain at least one oxide selected from the group consisting of $CuO$, $ZnO$, $Mn_2O_3$, $CoO$ and $Li_2O$, and particularly preferred to contain $CuO$.

A preferred tin oxide refractory of the present invention is a refractory wherein after heat treatment at 1,300° C. under −700 mmHg for 350 hours, the volatilization rate of $SnO_2$ is at most 1/5 as compared with a $SnO_2$ sintered body having a $SnO_2$ content of at least 99 mol %. At that time, the comparison is carried out by adjusting the open porosity difference between them to be at most 1%. Here, the open porosity is calculated by a known Archimedes method.

The tin oxide refractory of the present invention may be produced by uniformly mixing powder raw materials, forming the mixture into a desired shape and subjecting the formed mixture to sintering treatment at a high temperature of at least 1,200° C., preferably from 1,300 to 1,450° C. More specifically, fine powder raw materials are weighed in required amounts so that the components in the obtainable refractory would be in the above-mentioned contents, e.g. the components such $SnO_2$, $SiO_2$, $ZrO_2$, $CuO$, etc. would be in the prescribed blend amounts, and put in a rotary ball mill or a vibration ball mill, followed by mixing and pulverization by the pulverizer using an organic solvent such as ethanol as a medium. The obtained slurry is dried under reduced pressure, followed by press molding by means of metallic mold pressing or isostatic pressing, and the obtained molded product is sintered, for example, at 1,400° C. for 5 hours, to obtain a tin oxide refractory.

The raw materials are not limited to the above-mentioned combination of powders, and for example, a $ZrSiO_4$ powder may be used as a raw material for $ZrO_2$ and $SiO_2$ being volatilization-preventing components.

Further, a powder of a simple substance metal such as Zr, Si or Cu, a metal salt compound containing such a metal, $Zr(OH)_2$, $CuZrO_3$, $CuCO_3$, or $Cu(OH)_2$ may, for example, be used. Among them, $CuZrO_3$ or $CuCO_3$ is preferred.

In a case where a $ZrSiO_4$ powder is used as a raw material for $ZrO_2$ and $SiO_2$ being volatilization-preventing components, within a range wherein the solid solubility amount of $ZrO_2$ in $SnO_2$ is at most 12 mol %, $SnO_2$ serves as a dissociation accelerator of $ZrSiO_4$, and therefore, for example, by firing at 1,400° C. for 5 hours, it is possible to let $ZrSiO_4$ be dissociated to $ZrO_2$ and $SiO_2$, thereby to produce a tin oxide refractory of the present invention.

Further, in the case where a $ZrSiO_4$ powder is used as a raw material, it is not necessary, for example, to put raw material powders of $ZrO_2$ and $SiO_2$ dividedly into a mixing apparatus, whereby the production process can be simplified. Further, mixing of the raw material powders is simplified, and a uniform mixture is obtainable, which contribute to shortening of the production process and stability of the product quality.

EXAMPLES

Now, the present invention will be described specifically with reference to Examples and Comparative Examples, but it should be understood that the present invention is by no means restricted by such descriptions.

Ex 1 to 26

Firstly, as raw materials for producing tin oxide refractories, powder raw materials having average particle sizes, chemical components and purities as shown in Table 1 were prepared. Then, so that a tin oxide refractory would have a composition as shown in Table 2, powders of $SnO_2$, $ZrO_2$, $SiO_2$, $ZrSiO_4$, $Al_2O_3$, $Sb_2O_3$, CuO, $Mn_2O_3$, etc. were blended in the proportions as shown in Table 3.

In Table 2, in Ex (Ex 1, 2, 4 to 6, 11 to 17, 23 and 25) wherein the molar ratio of $ZrO_2$ to $SiO_2$ is 1:1, a $ZrSiO_4$ powder was used. Whereas, in Ex wherein the molar ratio of $ZrO_2$ to $SiO_2$ is not 1:1, a $ZrO_2$ powder and a $SiO_2$ powder were used.

TABLE 1

| Raw material powder | Purity, mass % | Average particle size μm |
|---|---|---|
| $SnO_2$ | 99.0 | 2.7 |
| $ZrO_2$ | 99.9 | 0.1 |
| $SiO_2$ | 99.9 | 4.0 |
| $ZrSiO_4$ | 99.5 | 1.1 |
| $Al_2O_3$ | 99.9 | 0.3 |
| $Sb_2O_3$ | 99.9 | 1.1 |
| CuO | 99.9 | 1.0 |
| $Mn_2O_3$ | 99.9 | 5.1 |
| $Li_2O$ | 99.0 | 3.0 |
| ZnO | 99.9 | 1.0 |

TABLE 2

| | Composition [mol %] | | | | | | | | | | | Content [mol %] based on ($SnO_2$ + $SiO_2$ + $ZrO_2$) | | |
|---|---|---|---|---|---|---|---|---|---|---|---|---|---|---|
| | $SnO_2$ | $ZrO_2$ | $SiO_2$ | $Al_2O_3$ | CuO | $Mn_2O_3$ | $Li_2O$ | ZnO | $Sb_2O_3$ | CaO | $Na_2O$ | $SnO_2$ content | $SiO_2$ content | $ZrO_2$ content |
| Ex 1 | 95.1 | 2.0 | 2.0 | 0.0 | 0.9 | 0.0 | 0.0 | 0.0 | 0.0 | 0.0 | 0.0 | 96.0 | 2.0 | 2.0 |
| Ex 2 | 89.1 | 5.0 | 5.0 | 0.0 | 0.9 | 0.0 | 0.0 | 0.0 | 0.0 | 0.0 | 0.0 | 89.9 | 5.0 | 5.0 |
| Ex 3 | 69.1 | 5.0 | 25.0 | 0.0 | 0.9 | 0.0 | 0.0 | 0.0 | 0.0 | 0.0 | 0.0 | 69.7 | 25.2 | 5.0 |
| Ex 4 | 75.1 | 12.0 | 12.0 | 0.0 | 0.9 | 0.0 | 0.0 | 0.0 | 0.0 | 0.0 | 0.0 | 75.8 | 12.1 | 12.1 |
| Ex 5 | 63.1 | 18.0 | 18.0 | 0.0 | 0.9 | 0.0 | 0.0 | 0.0 | 0.0 | 0.0 | 0.0 | 63.7 | 18.2 | 18.2 |
| Ex 6 | 49.1 | 25.0 | 25.0 | 0.0 | 0.9 | 0.0 | 0.0 | 0.0 | 0.0 | 0.0 | 0.0 | 49.5 | 25.2 | 25.2 |
| Ex 7 | 56.1 | 25.0 | 18.0 | 0.0 | 0.9 | 0.0 | 0.0 | 0.0 | 0.0 | 0.0 | 0.0 | 56.6 | 18.2 | 25.2 |
| Ex 8 | 85.1 | 2.0 | 12.0 | 0.0 | 0.9 | 0.0 | 0.0 | 0.0 | 0.0 | 0.0 | 0.0 | 85.9 | 12.1 | 2.0 |
| Ex 9 | 79.1 | 2.0 | 18.0 | 0.0 | 0.9 | 0.0 | 0.0 | 0.0 | 0.0 | 0.0 | 0.0 | 79.8 | 18.2 | 2.0 |
| Ex 10 | 71.1 | 10.0 | 18.0 | 0.0 | 0.9 | 0.0 | 0.0 | 0.0 | 0.0 | 0.0 | 0.0 | 71.7 | 18.2 | 10.1 |
| Ex 11 | 89.1 | 5.0 | 5.0 | 0.0 | 0.9 | 0.0 | 0.0 | 0.0 | 0.0 | 0.0 | 0.0 | 89.9 | 5.0 | 5.0 |
| Ex 12 | 75.1 | 12.0 | 12.0 | 0.0 | 0.9 | 0.0 | 0.0 | 0.0 | 0.0 | 0.0 | 0.0 | 75.8 | 12.1 | 12.1 |
| Ex 13 | 79.1 | 5.0 | 5.0 | 10.0 | 0.9 | 0.0 | 0.0 | 0.0 | 0.0 | 0.0 | 0.0 | 88.8 | 5.6 | 5.6 |
| Ex 14 | 69.1 | 5.0 | 5.0 | 20.0 | 0.9 | 0.0 | 0.0 | 0.0 | 0.0 | 0.0 | 0.0 | 87.4 | 6.3 | 6.3 |
| Ex 15 | 88.6 | 5.0 | 5.0 | 0.0 | 0.9 | 0.0 | 0.0 | 0.0 | 0.5 | 0.0 | 0.0 | 89.9 | 5.1 | 5.1 |
| Ex 16 | 87.6 | 5.0 | 5.0 | 0.0 | 0.0 | 2.4 | 0.0 | 0.0 | 0.0 | 0.0 | 0.0 | 89.8 | 5.1 | 5.1 |
| Ex 17 | 89.1 | 5.0 | 5.0 | 0.0 | 0.0 | 0.0 | 0.9 | 0.0 | 0.0 | 0.0 | 0.0 | 89.9 | 5.0 | 5.0 |
| Ex 18 | 99.1 | 0.0 | 0.0 | 0.0 | 0.9 | 0.0 | 0.0 | 0.0 | 0.0 | 0.0 | 0.0 | 100.0 | 0.0 | 0.0 |
| Ex 19 | 94.1 | 0.0 | 5.0 | 0.0 | 0.9 | 0.0 | 0.0 | 0.0 | 0.0 | 0.0 | 0.0 | 95.0 | 5.0 | 0.0 |
| Ex 20 | 95.1 | 4.0 | 0.0 | 0.0 | 0.9 | 0.0 | 0.0 | 0.0 | 0.0 | 0.0 | 0.0 | 96.0 | 0.0 | 4.0 |
| Ex 21 | 74.1 | 25.0 | 0.0 | 0.0 | 0.9 | 0.0 | 0.0 | 0.0 | 0.0 | 0.0 | 0.0 | 74.8 | 0.0 | 25.2 |
| Ex 22 | 59.1 | 5.0 | 35.0 | 0.0 | 0.9 | 0.0 | 0.0 | 0.0 | 0.0 | 0.0 | 0.0 | 59.6 | 35.3 | 5.0 |
| Ex 23 | 29.1 | 35.0 | 35.0 | 0.0 | 0.9 | 0.0 | 0.0 | 0.0 | 0.0 | 0.0 | 0.0 | 29.4 | 35.3 | 35.3 |
| Ex 24 | 57.1 | 40.0 | 2.0 | 0.0 | 0.9 | 0.0 | 0.0 | 0.0 | 0.0 | 0.0 | 0.0 | 57.6 | 2.0 | 40.4 |
| Ex 25 | 49.1 | 5.0 | 5.0 | 40.0 | 0.9 | 0.0 | 0.0 | 0.0 | 0.0 | 0.0 | 0.0 | 83.1 | 8.5 | 8.5 |
| Ex 26 | 0.0 | 0.0 | 1.3 | 92.6 | 0.0 | 0.0 | 0.0 | 0.0 | 0.5 | 0.0 | 5.6 | 0.0 | 100.0 | 0.0 |

TABLE 3

| | Composition [mass %] | | | | | | | | | | | Total content of SnO$_2$, SiO$_2$ and ZrO$_2$ in refractory [mass %] |
|---|---|---|---|---|---|---|---|---|---|---|---|---|
| | SnO$_2$ | ZrO$_2$ | SiO$_2$ | Al$_2$O$_3$ | CuO | Mn$_2$O$_3$ | Li$_2$O | ZnO | Sb$_2$O$_3$ | CaO | Na$_2$O | |
| Ex 1 | 97.0 | 1.7 | 0.8 | 0.0 | 0.5 | 0.0 | 0.0 | 0.0 | 0.0 | 0.0 | 0.0 | 99.5 |
| Ex 2 | 93.1 | 4.3 | 2.1 | 0.0 | 0.5 | 0.0 | 0.0 | 0.0 | 0.0 | 0.0 | 0.0 | 99.5 |
| Ex 3 | 82.7 | 4.9 | 11.9 | 0.0 | 0.5 | 0.0 | 0.0 | 0.0 | 0.0 | 0.0 | 0.0 | 99.5 |
| Ex 4 | 83.3 | 10.9 | 5.3 | 0.0 | 0.5 | 0.0 | 0.0 | 0.0 | 0.0 | 0.0 | 0.0 | 99.5 |
| Ex 5 | 73.9 | 17.2 | 8.4 | 0.0 | 0.5 | 0.0 | 0.0 | 0.0 | 0.0 | 0.0 | 0.0 | 99.5 |
| Ex 6 | 61.4 | 25.6 | 12.5 | 0.0 | 0.5 | 0.0 | 0.0 | 0.0 | 0.0 | 0.0 | 0.0 | 99.5 |
| Ex 7 | 66.7 | 24.3 | 8.5 | 0.0 | 0.5 | 0.0 | 0.0 | 0.0 | 0.0 | 0.0 | 0.0 | 99.5 |
| Ex 8 | 92.5 | 1.8 | 5.2 | 0.0 | 0.5 | 0.0 | 0.0 | 0.0 | 0.0 | 0.0 | 0.0 | 99.5 |
| Ex 9 | 89.5 | 1.9 | 8.1 | 0.0 | 0.5 | 0.0 | 0.0 | 0.0 | 0.0 | 0.0 | 0.0 | 99.5 |
| Ex 10 | 81.8 | 9.4 | 8.3 | 0.0 | 0.5 | 0.0 | 0.0 | 0.0 | 0.0 | 0.0 | 0.0 | 99.5 |
| Ex 11 | 92.7 | 4.2 | 2.1 | 0.0 | 0.0 | 1.0 | 0.0 | 0.0 | 0.0 | 0.0 | 0.0 | 99.5 |
| Ex 12 | 82.9 | 10.8 | 5.3 | 0.0 | 0.0 | 1.0 | 0.0 | 0.0 | 0.0 | 0.0 | 0.0 | 99.5 |
| Ex 13 | 85.6 | 4.4 | 2.2 | 7.3 | 0.5 | 0.0 | 0.0 | 0.0 | 0.0 | 0.0 | 0.0 | 92.2 |
| Ex 14 | 77.5 | 4.6 | 2.2 | 15.2 | 0.5 | 0.0 | 0.0 | 0.0 | 0.0 | 0.0 | 0.0 | 84.3 |
| Ex 15 | 92.1 | 4.3 | 2.1 | 0.0 | 0.5 | 0.0 | 0.0 | 0.0 | 1.0 | 0.0 | 0.0 | 98.4 |
| Ex 16 | 92.9 | 4.3 | 2.1 | 0.0 | 0.0 | 0.0 | 0.0 | 0.7 | 0.0 | 0.0 | 0.0 | 99.3 |
| Ex 17 | 93.1 | 4.3 | 2.1 | 0.0 | 0.0 | 0.0 | 0.5 | 0.0 | 0.0 | 0.0 | 0.0 | 99.5 |
| Ex 18 | 99.5 | 0.0 | 0.0 | 0.0 | 0.5 | 0.0 | 0.0 | 0.0 | 0.0 | 0.0 | 0.0 | 99.5 |
| Ex 19 | 97.4 | 0.0 | 2.1 | 0.0 | 0.5 | 0.0 | 0.0 | 0.0 | 0.0 | 0.0 | 0.0 | 99.5 |
| Ex 20 | 96.2 | 3.3 | 0.0 | 0.0 | 0.5 | 0.0 | 0.0 | 0.0 | 0.0 | 0.0 | 0.0 | 99.5 |
| Ex 21 | 78.0 | 21.5 | 0.0 | 0.0 | 0.5 | 0.0 | 0.0 | 0.0 | 0.0 | 0.0 | 0.0 | 99.5 |
| Ex 22 | 76.2 | 5.3 | 18.0 | 0.0 | 0.5 | 0.0 | 0.0 | 0.0 | 0.0 | 0.0 | 0.0 | 99.5 |
| Ex 23 | 40.4 | 39.7 | 19.4 | 0.0 | 0.5 | 0.0 | 0.0 | 0.0 | 0.0 | 0.0 | 0.0 | 99.5 |
| Ex 24 | 62.7 | 35.9 | 0.9 | 0.0 | 0.5 | 0.0 | 0.0 | 0.0 | 0.0 | 0.0 | 0.0 | 99.5 |
| Ex 25 | 59.4 | 5.0 | 2.4 | 32.7 | 0.5 | 0.0 | 0.0 | 0.0 | 0.0 | 0.0 | 0.0 | 66.8 |
| Ex 26 | 0.0 | 0.0 | 0.8 | 94.9 | 0.5 | 0.0 | 0.0 | 0.0 | 0.0 | 0.3 | 3.5 | 0.8 |

The blended raw material powders were mixed and pulverized for 48 hours by means of a rotary ball mill (trade name: AN-3S, manufactured by Aichi Electric Co., Ltd.) using ethanol (400 ml) as a medium, whereupon the obtained slurry was dried under reduced pressure and formed into a molded product by isostatic pressing (the pressing machine was manufactured by Nikkiso Co., Ltd., trade name: CL15-28-20) with 1,500 kg/cm$^2$. The obtained molded product was held at 1,400° C. for 5 hours in the atmospheric air atmosphere for firing and then cooled at a rate of 300° C./hr to obtain a tin oxide refractory.

A test piece having a diameter of 15 mm and a height of 5 mm was cut out from a part of the obtained tin oxide refractory and heat-treated at 1,300° C. in an environment of −700 mmHg for from 10 to 400 hours, whereby the mass reduction in each case was measured (using GH-252, trade name, manufactured by A & D Company, Limited), and the volatilization amount (unit: mg) and the volatilization rate (unit: mg/hr) were calculated.

Further, a test piece of 15 mm×25 mm×50 mm (vertical× horizontal×lengthwise) cut out from the obtained tin oxide refractory was immersed in soda lime glass (trade name: Sun Green VFL, manufactured by Asahi Glass Company Limited) at 1,300° C. for 100 hours in the atmospheric air atmosphere, whereupon the erosion degree was measured, and the erosion resistance was investigated.

The data of the volatilization rate and the erosion degree obtained as described above are summarized in Table 4.

TABLE 4

| | Volatilization rate | | Erosion degree (1,300° C., 100 hr) |
|---|---|---|---|
| | After 10 hr of heat treatment | After 350 hr of heat treatment | |
| Ex 1 | 15 | 7.6 | 11 |
| Ex 2 | 10.5 | 4 | 12 |
| Ex 3 | 12.6 | 7.1 | 14 |
| Ex 4 | 14.7 | 1.6 | 11 |
| Ex 5 | 10.4 | 1.3 | 12 |
| Ex 6 | 20.4 | 9.3 | 16 |
| Ex 7 | 13.6 | 5.7 | 14 |
| Ex 8 | 36.9 | 3.6 | 11 |
| Ex 9 | 37.7 | 3 | 15 |
| Ex 10 | 16.8 | 6.7 | 14 |
| Ex 11 | 14.2 | 5.8 | 12 |
| Ex 12 | 11.5 | 4.9 | 12 |
| Ex 13 | 18.7 | 6.2 | 17 |
| Ex 14 | 20.2 | 6.5 | 19 |
| Ex 15 | 11.2 | 5.1 | 15 |
| Ex 16 | 37.6 | 7.9 | 15 |
| Ex 17 | 20.1 | 4.2 | 9 |
| Ex 18 | 100 | 100 | 11 |
| Ex 19 | 167.7 | 113 | 11 |
| Ex 20 | 55.3 | 13.1 | 13 |
| Ex 21 | 47.3 | 11.9 | 8 |
| Ex 22 | 21.2 | 7.3 | 30 |
| Ex 23 | 30.5 | 11.5 | 33 |
| Ex 24 | 40.1 | 8.8 | 29 |
| Ex 25 | 22.3 | 4.9 | 35 |
| Ex 26 | 0 | 0 | 100 |

In Tables 2 to 4, Ex 1 to 17 are Examples of the present invention, and Ex 18 to 26 are Comparative Examples.

The erosion resistance to glass in each of Examples and Comparative Examples was compared with the alumina fused cast brick (trade name: MB-G, manufactured by AGC Ceramics Co., Ltd.) in Ex 26 which is widely used in glass production apparatus and was represented by an erosion degree relative to the maximum erosion depth being 100, of the eroded portion after the erosion test of MB-G.

Further, the volatilization rate in each of Ex 1 to 17 and Ex 18 to 26 was represented by a volatilization rate relative to the volatilization rate being 100 after the test piece in Ex 18 was heat-treated at 1,300° C. in an environment of −700 mmHg for 10 hours and 350 hours. Here, as the respective volatilization rates after the heat treatment for 10 hours and 350 hours, an average volatilization rate per unit surface area calculated from the mass reduction during the heat treatment time of from 0 hour to 10 hours, and an average volatilization rate per unit surface area calculated from the mass reduction during the heat treatment time of from 350 hours to 400 hours, are relatively shown.

Further, the open porosity of each sample was measured by an Archimedes method, and in each case, a sample with 1.0% or less was used.

Ex 18 represents a tin oxide sintered body having a composition excluding $ZrO_2$ and $SiO_2$, whereby the erosion resistance to glass is substantially equal to Ex 1 to 17, but since no volatilization-preventing component is contained, the volatilization rate of $SnO_2$ is very fast.

Ex 19 represents a tin oxide sintered body having a composition excluding $ZrO_2$, whereby the erosion resistance to glass is substantially equal to Ex 1 to 17, but since no $ZrO_2$ as a volatilization-preventing component is contained, the volatilization rate of $SnO_2$ is very fast.

Ex 20 and 21 represent a tin oxide sintered body having a composition excluding $SiO_2$, whereby the erosion resistance to glass is substantially equal to Ex 1 to 17, but since no $SiO_2$ is contained, the solid solubility limit concentration of $ZrO_2$ in $SnO_2$ is high. Further, the content of $ZrO_2$ as a volatilization-preventing component is small, whereby it takes time till $ZrO_2$ reaches the solid solubility limit concentration by volatilization of $SnO_2$, and the volatilization rate of $SnO_2$ after 10 hours of heat treatment is faster than in Ex 1 to 17. Further, since no $SiO_2$ is contained, also after 350 hours of heat treatment, the volatilization rate of $SnO_2$ is faster as compared with Ex 1 to 17.

Ex 22 represents a tin oxide sintered body having a composition wherein the amount of $SiO_2$ is increased, whereby the volatilization rate is substantially equal to Ex 1 to 17, but since the content of $SnO_2$ is small, the erosion resistance to glass is lower than in Ex 1 to 17.

Ex 23 represents a tin oxide sintered body having a composition wherein the amounts of $ZrO_2$ and $SiO_2$ are increased, whereby the volatilization rate is substantially equal to Ex 1 to 17, but since the content of $SnO_2$ is small, the erosion resistance to glass is lower than in Ex 1 to 17.

Ex 24 represents a tin oxide sintered body having a composition wherein the amount of $ZrO_2$ is increased, whereby the volatilization rate is substantially equal to Ex 1 to 17, but since the content of $SnO_2$ is small, the erosion resistance to glass is lower than in Ex 1 to 17.

Ex 25 represents a tin oxide sintered body having a composition wherein $Al_2O_3$ is incorporated as other component, whereby the volatilization rate is substantially equal to Ex 1 to 17, but since the content of $SnO_2$ is small, the erosion resistance to glass is lower than in Ex 1 to 17.

Ex 26 represents an alumina fused cast brick (trade name: MB-G, manufactured by AGC Ceramics Co., Ltd.), whereby no volatilization occurs, but the erosion resistance to glass is lower than in Ex 1 to 17.

On the other hand, Ex 1 to 17 representing Examples of the present invention present results such that the volatilization rate and the erosion resistance to glass are better as compared with Ex 18 to 26. From these evaluation results, it has been made clear that as compared with the tin oxide refractories in Comparative Examples, the tin oxide refractories in Examples of the present invention are excellent tin oxide refractories each being highly effective to prevent volatilization of $SnO_2$ and having a high erosion resistance to glass, with a good balance of both physical properties.

INDUSTRIAL APPLICABILITY

The tin oxide refractory of the present invention is excellent in erosion resistance to glass and capable of effectively preventing volatilization of $SnO_2$ and thus is suitable as a refractory for a glass melting furnace.

This application is a continuation of PCT Application No. PCT/JP2012/083928, filed on Dec. 27, 2012, which is based upon and claims the benefit of priority from Japanese Patent Application No. 2011-289690 filed on Dec. 28, 2011. The contents of those applications are incorporated herein by reference in their entireties.

What is claimed is:

1. A tin oxide refractory comprising $SnO_2$, $SiO_2$ and $ZrO_2$ as essential components,
wherein the total content of $SnO_2$, $SiO_2$ and $ZrO_2$ in the tin oxide refractory is at least 70 mass %, and,
based on the total content of $SnO_2$, $SiO_2$ and $ZrO_2$,
the content of $SnO_2$ is from 76 to 98 mol %,
the content of $SiO_2$ is from 1 to 12 mol % and
the content of $ZrO_2$ is from 1 to 35 mol %, and
wherein when heat treatment at 1,300° C. for 350 hours is conducted, a $ZrSiO_4$ phase and a $ZrO_2$ chase are formed on a sintered body surface of the tin oxide refractory.

2. The tin oxide refractory according to claim 1,
wherein the total content of $SnO_2$, $SiO_2$ and $ZrO_2$ is at least 95 mass %.

3. The tin oxide refractory according to claim 1,
wherein, based on the total content of $SnO_2$, $SiO_2$ and $ZrO_2$,
the content of $ZrO_2$ is from 1 to 12 mol %.

4. The tin oxide refractory according to claim 1, further comprising at least one component selected from the group consisting of CuO, $Cu_2O$, ZnO, $Mn_2O_3$, CoO, $Al_2O_3$, $Sb_2O_3$ and $Li_2O$.

5. The tin oxide refractory according to claim 1,
wherein after heat treatment at 1,300° C. under −700 mmHg for 350 hours, a volatilization rate of $SnO_2$ is at most $\frac{1}{5}$ as compared with a $SnO_2$ sintered body having a $SnO_2$ content of at least 99 mol %.

* * * * *